(12) United States Patent
Lei (10) Patent No.: US 10,986,658 B2
(45) Date of Patent: Apr. 20, 2021

(54) UPLINK/DOWNLINK SCHEDULING IN A WIRELESS COMMUNICATION SYSTEM

(71) Applicant: Lenovo Innovations Limited (Hong Kong), Hong Kong (CN)

(72) Inventor: Haipeng Lei, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/752,544

(22) PCT Filed: Aug. 14, 2015

(86) PCT No.: PCT/CN2015/086929
§ 371 (c)(1),
(2) Date: Feb. 13, 2018

(87) PCT Pub. No.: WO2017/028002
PCT Pub. Date: Feb. 23, 2017

(65) Prior Publication Data
US 2019/0014591 A1   Jan. 10, 2019

(51) Int. Cl.
*H04W 72/12* (2009.01)
*H04W 72/14* (2009.01)
(Continued)

(52) U.S. Cl.
CPC ... *H04W 72/1284* (2013.01); *H04W 72/1205* (2013.01); *H04W 72/1273* (2013.01);
(Continued)

(58) Field of Classification Search
CPC ......... H04W 72/1284; H04W 72/1205; H04W 72/1273; H04W 72/1289; H04W 72/14;
(Continued)

(56) References Cited

U.S. PATENT DOCUMENTS

| 9,419,776 B2* | 8/2016 | Gauvreau ............. H04L 1/1893 |
| 2012/0188976 A1* | 7/2012 | Kim ....................... H04L 1/0025 |
| | | 370/329 |

(Continued)

FOREIGN PATENT DOCUMENTS

| CN | 103460740 A | 12/2013 |
| KR | 20140002053 A | 1/2014 |
| WO | 2015020237 A1 | 2/2015 |

OTHER PUBLICATIONS

Rapeepat Ratasuk et al., "License-Exempt LTE Deployment in Heterogeneous Network", 2012 International Symposium on Wireless Communication Systems (ISWCS), Oct. 25, 2012, pp. 246-250.

*Primary Examiner* — Michael Thier
*Assistant Examiner* — Nevena Zecevic Sandhu
(74) *Attorney, Agent, or Firm* — Kunzler Bean & Adamson (57) ABSTRACT

Apparatuses, methods, and systems are disclosed for uplink/downlink scheduling. One apparatus includes a processor and a memory that stores code executable by the processor. The code determines an uplink schedule for data to be transmitted from a user equipment. The code determines a downlink schedule for data to be provided to the user equipment. The apparatus may include a transmitter that provides an uplink grant message to the user equipment to initiate an uplink transmission based on the uplink schedule. The uplink schedule and the downlink schedule are determined without using a predefined split pattern for uplink and downlink transmission.

17 Claims, 7 Drawing Sheets

(51) Int. Cl.
*H04W 74/08* (2009.01)
*H04W 72/04* (2009.01)

(52) U.S. Cl.
CPC ....... *H04W 72/1289* (2013.01); *H04W 72/14* (2013.01); *H04W 74/0816* (2013.01); *H04W 72/0446* (2013.01); *H04W 74/0808* (2013.01)

(58) Field of Classification Search
CPC ......... H04W 74/0816; H04W 72/0446; H04W 74/0808
See application file for complete search history.

(56) References Cited

U.S. PATENT DOCUMENTS

| | | |
|---|---|---|
| 2013/0083706 A1 | 4/2013 | Lin |
| 2015/0085797 A1 | 3/2015 | Ji et al. |
| 2016/0095040 A1* | 3/2016 | Valliappan ............ H04W 16/14 370/332 |
| 2016/0309464 A1* | 10/2016 | Mukherjee ............ H04W 28/06 |
| 2016/0309467 A1* | 10/2016 | Yerramalli ............ H04L 1/1812 |
| 2018/0167821 A1* | 6/2018 | Seok ................... H04L 5/0053 |

* cited by examiner

UPLINK/DOWNLINK SCHEDULING IN A WIRELESS COMMUNICATION SYSTEM

FIELD

The subject matter disclosed herein relates generally to wireless communications and more particularly relates to uplink/downlink scheduling in a wireless communication system.

BACKGROUND

The following abbreviations are herewith defined, at least some of which are referred to within the following description.

3GPP Third Generation Partnership Project
CCA Clear Chanel Assessment
DL Downlink
ECCA Extended Clear Channel Assessment
eNB Evolved Node B
ETSI European Telecommunications Standards Institute
FBE Frame Based Equipment
FDMA Frequency Division Multiple Access
LAA Licensed Assisted Access
LBE Load Based Equipment
LBT Listen Before Talk
LTE Long Term Evolution
MCS Modulation and Coding Scheme
MU-MIMO Multi-User, Multiple-Input, Multiple-Output
OFDM Orthogonal Frequency Division Multiplexing
PCell Primary Cell
PUSCH Physical Uplink Shared Channel
QoS Quality of Service
RRC Radio Resource Control
SC-FDMA Single Carrier Frequency Division Multiple Access
SCell Secondary Cell
TBS Transport Block Size
TDD Time-Division Duplex
TDM Time Division Multiplex
UE User Entity/Equipment (Mobile Terminal)
UL Uplink
UMTS Universal Mobile Telecommunications System
WiMAX Worldwide Interoperability for Microwave Access In Wireless Communications networks, for example, in LTE systems using LAA, an unlicensed spectrum is used with assistance from a licensed carrier. LAA may facilitate a fair coexistence with other technologies over the unlicensed spectrum and satisfy various regulatory requirements in different countries and regions.

For regulation requirements in Europe, ETSI has specified two channel access mechanism (i.e., FBE and LBE). For these two channel access mechanisms, before starting transmissions on an operating channel, the equipment (i.e., FBE and LBE) may perform a CCA check by using energy detection with the CCA observation time not less than 20 microseconds ("us"). If the energy level in the channel does not exceed a predefined threshold corresponding to the power level, the equipment may consider the operating channel to be clear and may transmit immediately. In contrast, the equipment may consider the operating channel to be occupied and may continue to perform the CCA check. For FBE, the equipment may continue to perform the CCA check at an end of a frame period. For LBE, the equipment may start performing ECCA immediately until it can grab the channel. In some situations, LBE may have a higher channel access probability than FBE.

Although LBE may have a higher channel access probability than FBE, FBE may be more appropriate for LAA UL. For example, FBE can follow the LTE UL framework that a UE's UL transmission should be permitted by a serving eNB, FBE can avoid inter-UE blocking and enable UL multiplexing of multiple UEs in one subframe by FDMA and MU-MIMO, FBE does not require a reservation signal, and FBE has a fixed timing relationship and UL transmission can always start from the first OFDM symbol of a subframe. Accordingly, in certain configurations, FBE may be used as a baseline for LAA UL operation. In contrast, LBE may be more appropriate for LAA DL.

As set forth above, different channel access mechanisms (i.e., FBE and LBE) have different merits. Due to enabling frequency reuse being an option for LAA, DL and UL can be designed with different channel access mechanisms. Accordingly, combining different channel access mechanisms may be possible for LAA.

There are currently seven existing TDD UL/DL configurations to facilitate UL/DL multiplexing; however, these configurations do not facilitate efficient DL and UL resource usage in LAA. This is especially true because different countries have different regulatory requirements. For example, the maximum frame period of FBE in Japan is 4 milliseconds ("ms"), which is difficult to adapt to the existing TDD UL/DL configurations that are based on a 10 ms frame length. Furthermore, if LBE is used for LAA DL transmission, LBE is too dynamic and unpredictable to fit with one of the existing TDD UL/DL configurations. Moreover, there is also no DL only configuration included in the existing TDD DL/UL configurations. Therefore, there is no current design that will facilitate UL and DL transmission over the unlicensed spectrum that facilitate efficient DL and UL resource usage and flexibly that meets the different regulatory requirements in different regions.

BRIEF SUMMARY

Apparatuses for uplink/downlink scheduling are disclosed. Methods and systems also perform the functions of the apparatus. In one embodiment, the apparatus includes a processor and a memory that stores code executable by the processor. The code, in various embodiments, determines an uplink schedule for data to be transmitted from a user equipment. In a further embodiment, the code determines a downlink schedule for data to be provided to the user equipment. The apparatus may include a transmitter that provides an uplink grant message to the user equipment to initiate an uplink transmission based on the uplink schedule. In certain embodiments, the uplink schedule and the downlink schedule are determined without using a predefined split pattern for uplink and downlink transmission.

In a further embodiment, the code includes code that reserves a gap between downlink transmission and the uplink transmission to enable the user equipment to perform a clear channel assessment ("CCA") and switch from receiving ("Rx") to transmitting ("Tx"). In some embodiments, the uplink grant message includes an indication that indicates timing for the uplink transmission. In another embodiment, the indication within the uplink grant message includes an offset between a subframe in which the uplink grant message is received and a subframe in which the uplink transmission begins.

In another embodiment, the indication within the uplink grant message includes an index to indicate a subframe in which to begin the uplink transmission. In one embodiment, the uplink grant message includes a subframe type indication within the uplink grant message to indicate whether an uplink subframe is to be full or partial.

A method for uplink/downlink scheduling, in one embodiment, includes determining, by use of a processor, an uplink schedule for data to be transmitted from a user equipment. In some embodiments, the method includes determining a downlink schedule for data to be provided to the user equipment. In a further embodiment, the method includes providing an uplink grant message to the user equipment to initiate an uplink transmission based on the uplink schedule. In certain embodiments, the uplink schedule and the downlink schedule are determined without using a predefined split pattern for uplink and downlink transmission.

In some embodiments, the method includes reserving a gap between downlink transmission and the uplink transmission to enable the user equipment to perform a clear channel assessment ("CCA") and switch from Rx to Tx. In one embodiment, the method include performing a listen before talk ("LBT") operation to determine whether an operating channel is clear. In such an embodiment, the method may include providing a downlink transmission based on the downlink schedule if the operating channel is clear. In certain embodiments, performing the LBT operation includes performing the LBT operation in a second slot of a last subframe of the uplink transmission.

In some embodiments, providing the uplink grant message to the user equipment to initiate the uplink transmission includes providing an indication within the uplink grant message to indicate timing for the uplink transmission. In such embodiments, providing the indication within the uplink grant message to indicate timing for the uplink transmission includes providing an offset between a subframe in which the uplink grant message is received and a subframe in which the uplink transmission begins.

In some embodiments, providing the indication within the uplink grant message to indicate timing for the uplink transmission includes providing an index to indicate a subframe in which to begin the uplink transmission. In certain embodiments, providing the uplink grant message to the user equipment to initiate the uplink transmission includes providing a subframe type indication within the uplink grant message to indicate whether an uplink subframe is to be full or partial.

In one embodiment, an apparatus includes a receiver that receives an uplink grant message, a processor, and a memory. The memory may store code executable by the processor. In a further embodiment, the code may include code that determines an uplink schedule for data to be transmitted based on a portion of the uplink grant message. The apparatus, in one embodiment, includes a transmitter that transmits data based on the uplink schedule. In some embodiments, the uplink schedule is part of a schedule that does not use a predefined split pattern for uplink and downlink transmission.

Another method for uplink/downlink scheduling, in one embodiment, includes receiving, by use of a processor, an uplink grant message. In some embodiments, the method includes determining an uplink schedule for data to be transmitted based on a portion of the uplink grant message. In one embodiment, the method includes transmitting the data based on the uplink schedule. In certain embodiments, the uplink schedule is part of a schedule that does not use a predefined split pattern for uplink and downlink transmission.

In some embodiments, determining the uplink schedule for data to be transmitted based on the portion of the uplink grant message includes determining the uplink schedule based on an indication within the uplink grant message of an offset between a subframe in which the uplink grant message is received and a starting subframe for uplink transmission. In one embodiment, determining the uplink schedule for data to be transmitted based on the portion of the uplink grant message includes determining the uplink schedule based on an indication within the uplink grant message of an index of a starting subframe for uplink transmission. In certain embodiments, the method includes determining whether a subframe of the data to be transmitted is to be a full subframe or a partial subframe based on an indication in the uplink grant message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the contest of this document, a compute readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a" "an/" and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuity, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational stops to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
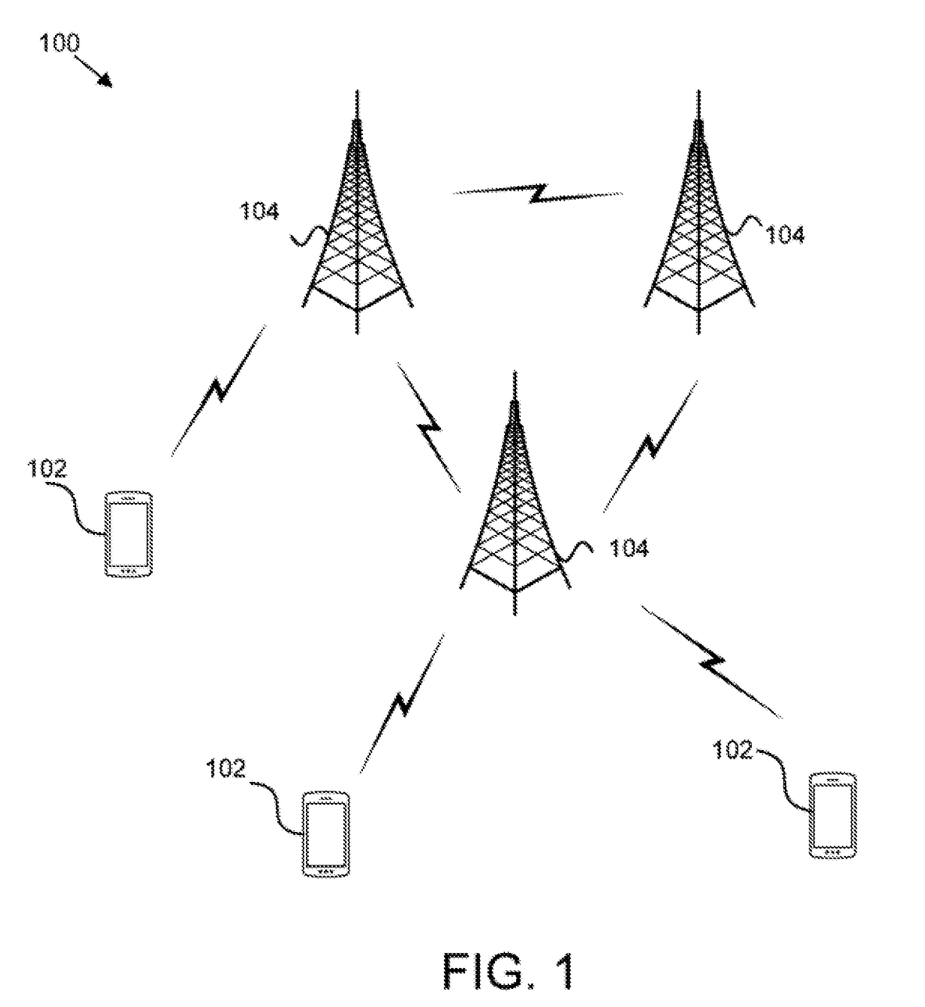
FIG. 1 is a schematic block diagram illustrating one embodiment of a wireless communication system for uplink/downlink scheduling.

FIG. 1 depicts an embodiment of a wireless communication system 100 for uplink/downlink scheduling. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 162 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communicate system 100 is compliant with the LIE of the 3GPP UMTS protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determines a UL schedule for data to be transmitted from a remote unit 102. The base unit 104 may also determine a DL schedule for data to be provided to the remote unit 102. The base unit 104 may provide a UL grant message to the remote unit 102 to initiate a UL transmission based on the UL schedule. In some embodiments, the UL schedule and the DL schedule are determined without using a predefined split pattern for UL and DL transmission. In certain embodiments, the remote unit 102 may receive the UL grant message. In addition, the remote unit 102 may determine the UL schedule for data to be transmitted based on a portion of the UL grant message. Furthermore, the remote unit 102 may transmit the data based on the UL schedule.

Figure 2:
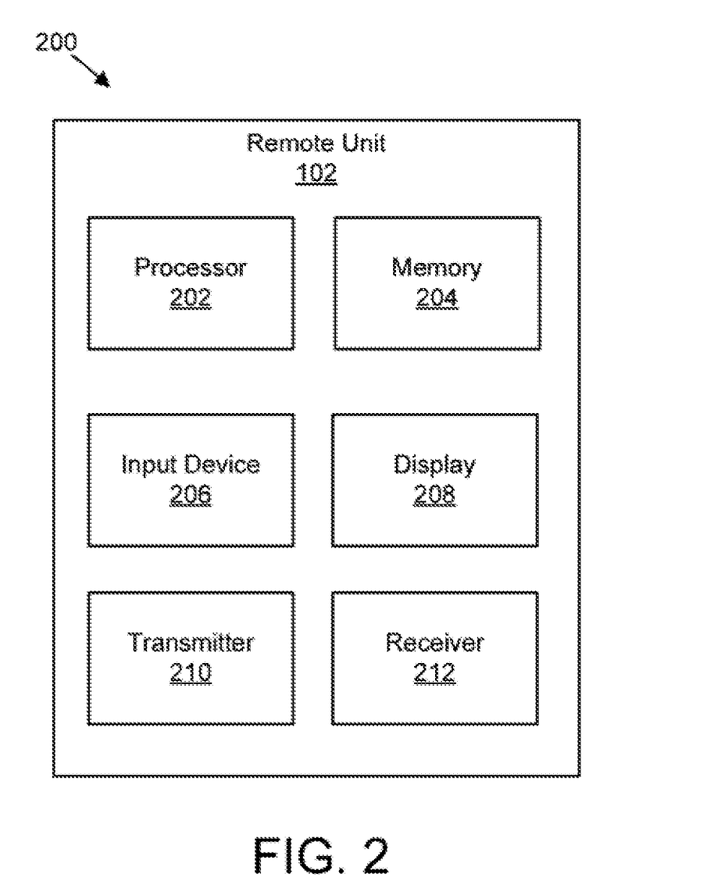
FIG. 2 is a schematic block diagram illustrating one embodiment of an apparatus that may be used for uplink/downlink scheduling.

FIG. 2 depicts one embodiment of an apparatus 200 that may be used for uplink/downlink scheduling. The apparatus 200 includes one embodiment of the remote unit 102. Furthermore, the remote unit 102 may include a processor 202, a memory 204, au input device 206, a display 208, a transmitter 210, and a receiver 212. In some embodiments, the input device 206 and the display 208 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to UL/DL scheduling. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 208 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input devise 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen of similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit data to the base unit 104 based on a UL schedule. In another embodiment, the receiver 212 may receive a UL grant message sent by the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
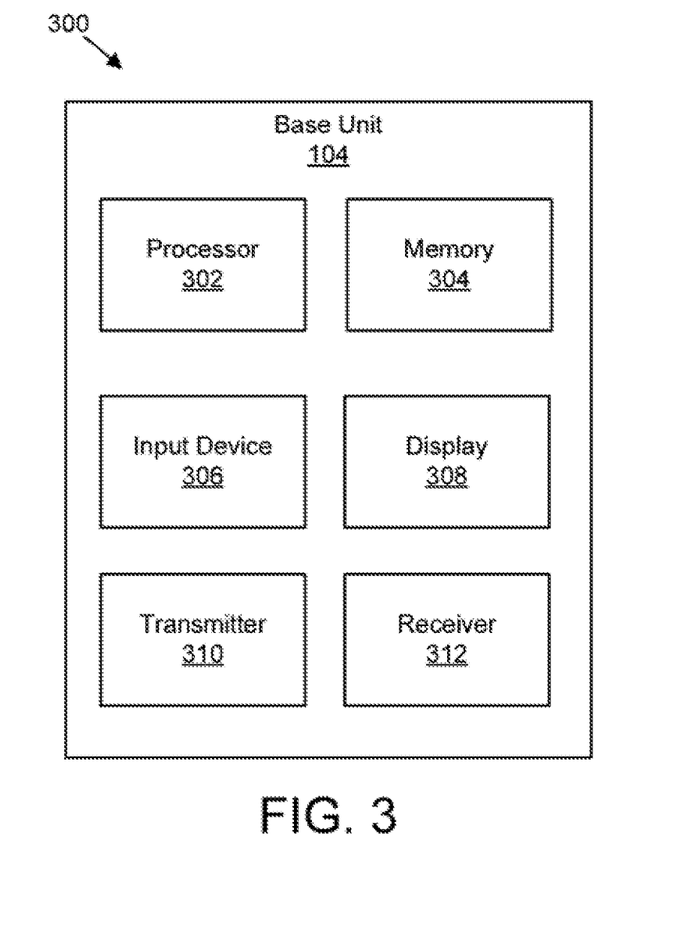
FIG. 3 is a schematic block diagram illustrating another embodiment of an apparatus that may be used for uplink/downlink scheduling.

FIG. 3 depicts another embodiment of an apparatus 300 that may be used for uplink/downlink scheduling. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The transmitter 310 is used to provide DL communication signals to the remote unit 102 and the receiver 312 is used to receive UL communication signals from the remote unit 102. In one embodiment, the transmitter 310 is used to provide a UL grant message to the remote unit 102 (e.g., UE) to initiate a UL transmission based on a UL schedule. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
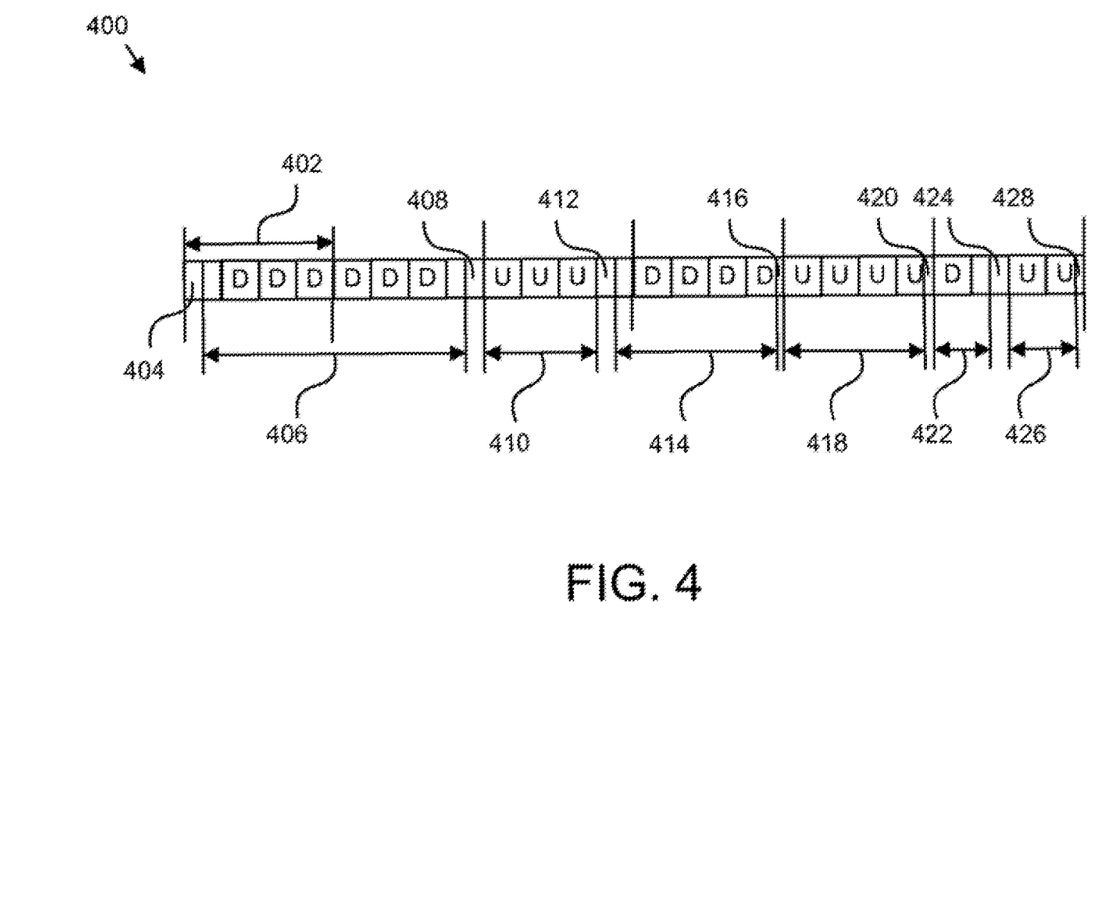
FIG. 4 illustrates one embodiment of a frame sequence that uses uplink/downlink scheduling.

FIG. 4 depicts one embodiment of a frame sequence 400 that uses uplink/downlink scheduling. The frame sequence 400 uses an implicit UL/DL transmission scheme for LAA in which both UL and DL transmissions use different LBT schemes on the same carrier over the unlicensed spectrum (e.g., FBE for UL and LBE for DL).

Within the frame sequence 400, switching may be dependent on UL and DL traffic amounts and/or QoS requirements. For example, if traffic is DL heavy, the base unit 104 may seek access to the unlicensed spectrum using LBE LBT. In contrast, if traffic is UL heavy, the base unit 104 may send a UL grant message to a remote unit 102 and reserve a time period (e.g., gap between DL and UL) as a CCA period before the first subframe of UL burst, then the remote unit 102 may start a UL burst transmission if a FBE CCA check is successful. As may be appreciated, using such a UL/DL transmission scheme, there is no fixed or predefined UL/DL pattern to split the UL and DL transmission on the same unlicensed carrier, instead, the base unit 104 determines the UL/DL scheduling based on an amount of UL and/or DL traffic.

For UL, the base unit 104 does not need to indicate a configuration of the FBE mechanism (e.g., frame period, starting position, etc.) to the remote unit 102. Indeed, the remote unit 102 behavior in the unlicensed spectrum (including CCA check) may be completely controlled by the base unit 104. Specifically, for the remote unit 102 to know the timing for PUSCH transmission and/or retransmission, the base unit 104 indicates concrete timing information in the UL grant message. Such timing information may be a three-bit signaling to indicate an offset between the subframe in which the UL grant is received and the subframe for PUSCH transmission and/or retransmission, or a four-bit signaling to indicate the concrete index of a subframe for PUSCH transmission and/or retransmission, as explained in detail below.

From the perspective of the base unit 104, the base unit 104 is aware of the FBE frame period and starting position. Therefore, the base unit 104 may schedule the remote unit's 102 UL transmission to follow the FBE rules and enable multiple remote unit 102 multiplexing in one subframe using FDM or MU-MIMO. From the perspective of the remote unit 102, upon receiving a UL grant message, the remote unit 102 performs a CCA check before the indicated subframe for PUSCH transmission and/or retransmission then starts the PUSCH transmission and/or retransmission if the CCA check is successful, or drops/suspends the PUSCH transmission and/or retransmission and waits for a new command from the base unit 104.

According to FBE rules, if the remote unit's 102 burst has the same length as the frame period, the remote unit 102 needs to reserve some symbols for an idle period having a length of at least 5% of the maximum channel occupancy time. Because there may be multiple different frame periods, a corresponding TBS for the last UL subframe within a frame period may be needed. Became the idle period is the largest if the frame period is set to 10 ms, a maximum of 7 OFDM symbols may be reserved for the idle period to cover all possible frame periods up to 10 ms (this is currently the largest standard frame period length). Therefore, in certain embodiments, only the first slot (e.g., first half of a subframe) of the last UL subframe in each frame period can be used for UL transmission, and the second slot (e.g., second half of the subframe) of the last UL subframe in each frame period is reserved for the idle period.

Because the remote unit 102 is not aware of the frame period and the end subframe of the frame period, a flag bit called a subframe type indication ("STI") may be used in the UL grant to indicate to the remote unit 102 whether the scheduled UL subframe is to be full or partial. For example, an STI of "0" may indicate that the scheduled UL subframe is to be a full subframe (e.g., two slots may be used for UL transmission), while an STI of "1" may indicate that the scheduled UL subframe is to be a partial subframe (e.g., only the first slot may be used for UL transmission). As may be appreciated, the base unit 104 may immediately start ECCA for DL LBT from the beginning of the second slot of a partial UL subframe because the base unit 104 knows the UL transmission will only occur in the first slot. Using a frame sequence 400 including the elements described above, the remote unit 102 behaviors on the unlicensed spectrum may be simplified and the UL and DL performance may be improved. Furthermore, as described herein, there is not any additional RRC signaling and/or physical layer signaling. The illustrated frame sequence 400 is one example of implementing the above elements and will be explained in greater detail below.

The frame sequence 400 is determined using a UL schedule and a DL schedule that do not have a predefined split pattern for UL and DL transmission, unlike predefined TDD configurations in which there are seven predefined UL/DL configurations. Indeed, the length of each DL transmission and UL transmission may be dependent on UL and DL traffic amounts and/or QoS requirements, as explained above. In the illustrated frame sequence 400, a frame period 402 has a length of four subframes (i.e., 4 ms). However, it should be noted that the frame period 402 in other embodiments may have any suitable number of subframes, such as 1, 2, 3, 5, 6, 7, 8, 9, or 10, for example.

To begin the frame sequence 400, the base unit 104 may perform ECCA during a first transition period 404 prior to DL transmission. As illustrated, the first transition period 404 extends for only part of a subframe. After a successful completion of ECCA, the base unit 104 may begin DL transmission for a first DL period 406. In the present example, the first DL period 406 includes six full subframes and two partial subframes. As may be appreciated, the first DL period 406 may be longer than the frame period 402 (e.g., four subframes) and/or may occupy an entire frame. Indeed, the first DL period 406 may be any suitable length determined by the base unit 104.

After the first DL period 406, during a second transition period 408, the base unit 104 may send a UL grant message to the remote unit 102 and the remote unit 102 may perform CCA in response to the UL grant message. If the CCA is successful, the remote unit 102 may transmit UL data during a first UL period 410. As illustrated, the first UL period 410 includes three full subframes. As may be appreciated, the first UL period 410 may include a maximum of three full subframes and one partial subframe in the current example because the frame period 402 is four subframes. However, in other embodiments, a UL frame period may be longer, such as nine full subframes and one partial subframe in an embodiment with a frame having ten subframes. The base unit 104 knows when the first UL period 410 ends, so the base unit 104 may immediately begin ECCA at the end of the first UL period 410 during a third transition period 412.

After a successful completion of ECCA during the third transition period 412, the base unit 104 may begin DL transmission for a second DL period 414. In the present example, the second DL period 414 includes three full subframes and two partial subframes. In other embodiments, the second DL period 414 may be any suitable length determined by the base unit 104. After the second DL period 414, during a fourth transition period 416, the base unit 104 may send a UL grant message to the remote unit 102 and the remote unit 102 may perform CCA in response to the UL grant message. If the CCA is successful, the remote unit 102 may transmit UL data during a second UL period 418. As illustrated, the second UL period 418 includes three full subframes and one partial subframe. The base unit 104 knows when the second UL period 418 ends, so the base unit 104 may immediately begin ECCA at the end of the second UL period 418 during a fifth transition period 420.

After a successful completion of ECCA during the fifth transition period 420, the base unit 104 may begin DL transmission for a third DL period 422. In the present example, the third DL period 422 includes one full subframe and one partial subframe. In other embodiments, the third DL period 422 may be any suitable length determined by the base unit 104. After the third DL period 422, during a sixth transition period 424, the base unit 104 may send a UL grant message to the remote unit 102 and the remote unit 102 may perform CCA in response to the UL grant message. If the CCA is successful, the remote unit 102 may transmit UL data during a third UL period 426. As illustrated, the third UL period 426 includes one full subframe and one partial subframe. The base unit 104 knows when the third UL period 426 ends, so the base unit 104 may immediately begin ECCA at the end of the third UL period 426 during a seventh transition period 428. As may be appreciated, the above described pattern may be repeated as often is needed to complete UL and DL transmissions. Thus, as described herein, the base unit 104 may determine the UL and DL schedules during operation without using a predefined split pattern for UL and DL transmission.

Figure 5A:
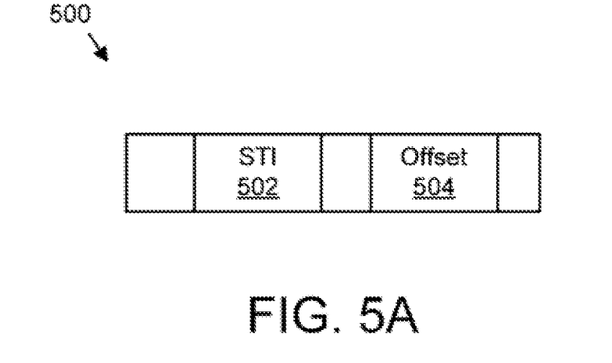
FIG. 5A is a schematic block diagram illustrating one embodiment of a UL grant message.

FIG. 5A is a schematic block diagram illustrating one embodiment of a UL grant message 500, which may be transmitted from the base unit 104 to the remote unit 102. The UL grant message 500 includes a STI 502 and an offset 504. The STI 502 may be used to indicate to the remote unit 102 whether the scheduled UL subframe of a UL transmission is to be full or partial. For example, an STI of "0" may indicate that the scheduled UL subframe is to be a full subframe (e.g., two slots may be used for UL transmission), while as STI of "1" may indicate that the scheduled UL subframe is to be a partial subframe (e.g., only the first slot may be used for UL transmission).

The offset 504 may be used to indicate an offset between the subframe in which the UL grant message 500 is received and the subframe for PUSCH transmission or retransmission to begin. For example, if the UL grant message 500 is received in a third subframe and the PUSCH transmission or retransmission is to start in a seventh subframe of the same frame, the offset 504 may be "4." As another example, if the UL grant message 500 is received in a ninth subframe of a first frame having ten subframes and the PUSCH transmission or retransmission is to start in a first subframe of a second frame that directly follows the first frame, the offset 504 may be "2." In certain embodiments, the offset 504 may be no less than four. In one embodiment, the offset 504 may use a three-bit signal within the UL grant message 500 to cover an offset of up to seven (e.g., if binary "000" represents an offset of zero) or eight (e.g., if binary "000" represents an offset of one), while in other embodiments, the offset 504 may use a smaller or larger number of bits. Although the STI 502 and the offset 504 are illustrated as being in certain locations within the UL grant message 500, the STI 502 and the offset 504 may be positioned at any location and/or in any order within the UL grant message 500. Furthermore, the UL grant message 500 may include other information in addition to, or as an alternative to, the STI 502 and the offset 504.

Figure 5B:
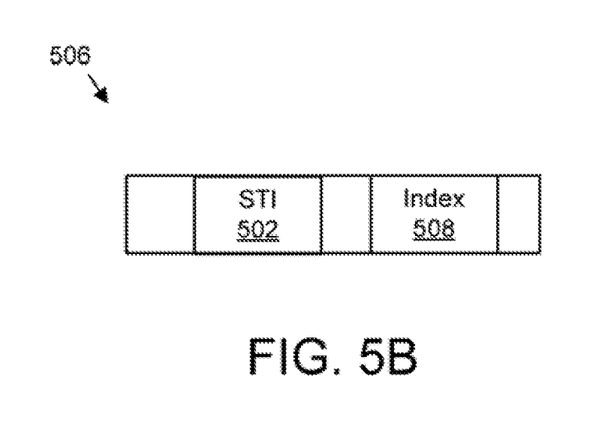
FIG. 5B is a schematic block diagram illustrating another embodiment of a UL grant message.

FIG. 5B is a schematic block diagram illustrating another embodiment of a UL grant message 506, which may be transmitted from the base unit 104 to the remote unit 102. The UL grant message 506 includes the STI 502 and an index 508. The STI 502 may be substantially similar to the STI 502 described in FIG. 5A.

The index 508 may be used to indicate a concrete index of a subframe for PUSCH transmission or retransmission. For example, in an embodiment having ten subframes with the first subframe being subframe 0 and the last subframe being subframe 9, the index 508 may be one of binary "0000" representing subframe 0 through binary "1001" representing subframe 9. As another example, in an embodiment having ten subframes with the first subframe being subframe 1 and the last subframe being subframe 10, the index 508 may be one of binary "0001" representing subframe 1 through binary "1010" representing subframe 10. In one embodiment, the index 508 may use a four-bit signal within the UL grant message 506, while in other embodiments, the index 508 may use a smaller or larger number of bits. Although the STI 502 and the index 508 are illustrated as being in certain locations within the UL grant message 506, the STI 502 and the index 508 may be positioned at any location and/or in any order within the UL grant message 506. Furthermore, the UL grant message 506 may include other information in addition to, or as an alternative to, the STI 502 and the index 508.

Figure 6:
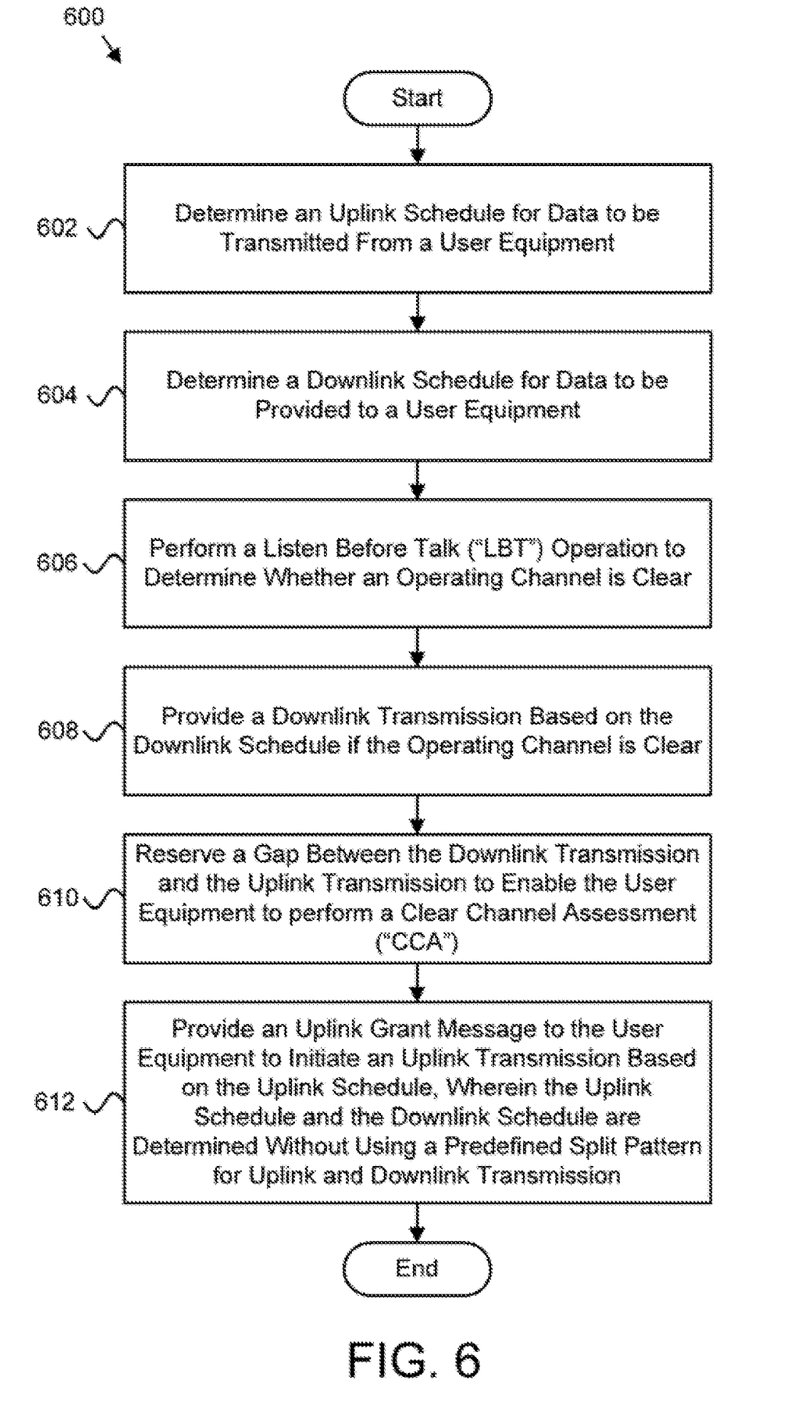
FIG. 6 is a schematic flow chart diagram illustrating one embodiment of a method for uplink/downlink scheduling from a base unit.

FIG. 6 is a schematic flow chart diagram illustrating one embodiment of a method 600 for uplink/downlink scheduling from a base unit 104. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 a UL schedule for data to be transmitted from a remote unit 102 (e.g., a UE). In one embodiment, the base unit 104 may determine 602 the UL schedule for data to be transmitted from the remote unit 102. The method 600 may also include determining 604 a DL schedule for data to be provided to a remote unit 102. In one embodiment, the base unit 104 may determine 604 the DL schedule for date to be transmitted from the remote unit 102. It should be noted that in one embodiment, the UL schedule for data to be transmitted from the remote unit 102 may be for a first remote unit 102, while the DL schedule for data to be provided to the remote unit 102 may be for a second remote unit 102, and in another embodiment, the UL schedule for data to be transmitted from the remote unit 102 may be for a first remote unit 102 and the DL schedule for data to be provided to the remote unit 102 may also be for the first remote unit 102.

In certain embodiments, the method 600 may include performing 606 a LBT operation to determine whether an operating channel is clear. In some embodiments, the base unit 104 performs 606 the LBT operation to determine whether the operating channel is clear. In certain embodiments, performing 606 the LBT operation includes performing the LBT operation in a second slot of a last subframe of a UL transmission. The method 600 may also include providing 608 a DL transmission based on the DL schedule if the operating channel is clear. In one embodiment, the base unit 104 provides 608 the DL transmission based on the DL schedule if the operating channel is clear.

In certain embodiments, the method 600 includes reserving 610 a gap between DL transmissions based on the DL schedule and the UL transmissions to enable the remote unit 102 to perform a CCA. In one embodiment, the base unit 104 reserves 610 the gap between the DL transmissions and the UL transmissions to enable the remote unit 102 to perform the CCA. The method 600 may include providing 612 a UL grant message (e.g., UL grant message 500, 506) to the remote unit 102 to initiate a UL transmission based on the UL schedule. Then the method 600 may end. In one embodiment the transmitter 310 of the base unit 104 may provide 612 the UL grant message to the remote unit 102 to initiate the UL transmission based on the UL schedule.

In some embodiments, providing 612 the UL grant message to the remote unit 102 to initiate the UL transmission includes providing an indication within the UL grant message to indicate timing for the UL transmission. Furthermore, in certain embodiments, providing the indication within the UL grant message to indicate timing for the UL transmission includes providing an offset (e.g., the offset 504) between a subframe in which the UL grant message is received and a subframe in which the UL transmission begins. In another embodiment, providing the indication within the UL grant message to indicate timing for the UL transmission includes providing an index (e.g., the index 508) to indicate a subframe in which to begin the UL transmission. In some embodiments of the method 600, providing 612 the UL grant message to the remote unit 102 to initiate the UL transmission includes providing a STI (e.g., the STI 502) within the UL grant message to indicate whether the last UL subframe is to be full or partial. It should be noted that in certain embodiments, providing 612 the UL grant message to the remote unit 102 may occur before reserving 610 the gap between the DL transmission and the UL transmission to facilitate providing 612 the UL grant message at least 4 ms earlier than UL transmission (e.g., PUSCH transmission).

Figure 7:
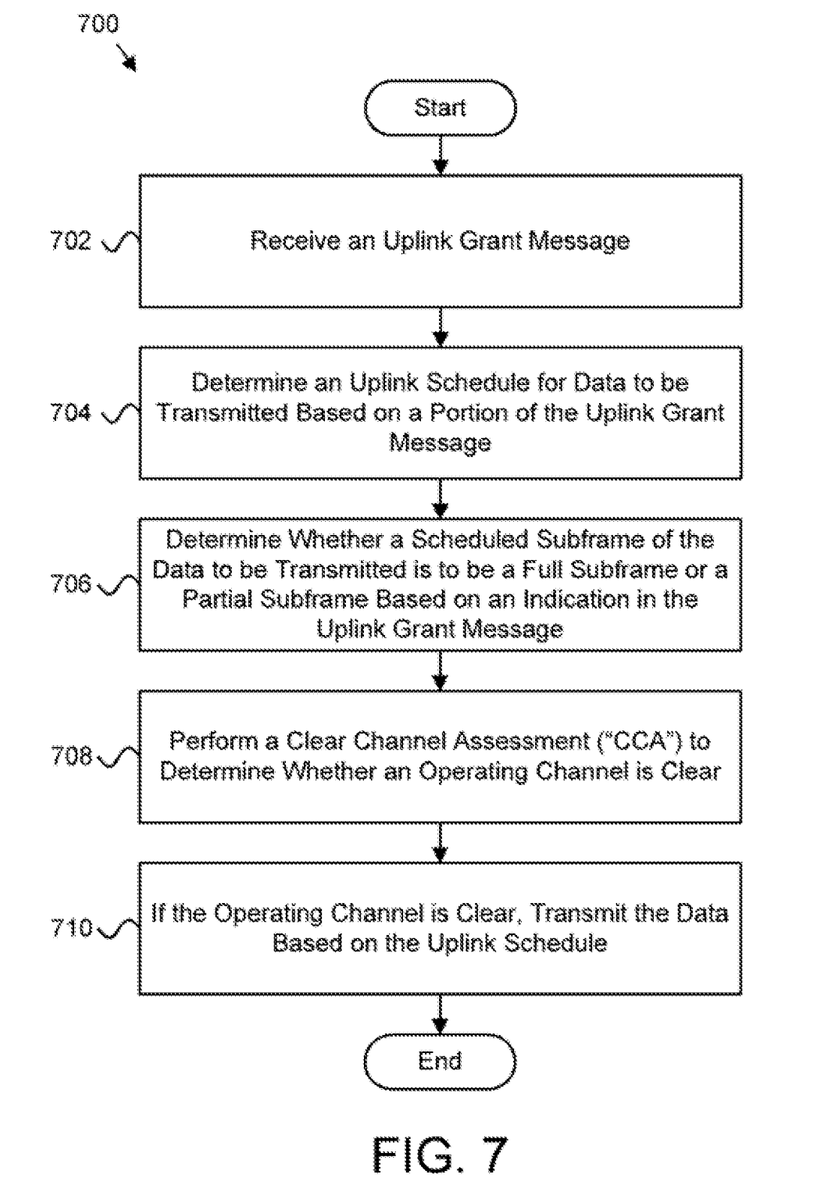
FIG. 7 is a schematic flow chart diagram illustrating one embodiment of a method for a remote unit to receive uplink/downlink scheduling from a base unit.

FIG. 7 is a schematic flow chart diagram illustrating one embodiment of a method 700 for a remote unit 102 to receive uplink/downlink scheduling from a base unit 104. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a UL grant message (e.g., UL grant message 500, 506). In one embodiment, the receiver 212 of the remote unit 102 may receive the UL grant message from the base unit 104. The method 700 may also include determining 704 a UL schedule for data to be transmitted based on a portion of the UL grant message. In certain embodiments, the remote unit 102 may determine 704 the UL schedule for data to be transmitted based on the portion of the UL grant message. In some embodiments, determining 704 the UL schedule for data to be transmitted based on the portion of the UL grant message includes determining the UL schedule based on an indication within the UL grant message of an offset (e.g., the offset 504) between a subframe in which the UL grant message is received and a starting subframe for UL transmission. In other embodiments, determining 704 the UL schedule for data to be transmitted based on the portion of the UL grant message includes determining the UL schedule based on an indication within the UL grant message of an index (e.g., the index 508) of a starting subframe for UL transmission.

The method 700 may determine 706 whether a scheduled subframe of the data to be transmitted is to be a full subframe or a partial subframe based on an indication (e.g., the STI 502) in the UL grant message. In some embodiments, the remote unit 102 may determine 706 whether the scheduled subframe of the data to be transmitted is to be a full subframe or a partial subframe based on the indication in the UL grant message. The method 700 may perform 708 a CCA to determine whether an operating channel is clear. In one embodiment, the remote unit 102 may perform 708 the CCA to determine whether the operating channel is clear.

The method 700 may include transmitting 710 the data based on the UL schedule if the operating channel is clear. Then the method 700 may end. In one embodiment, the transmitter 210 may transmit 710 the data based on the UL schedule if the operating channel is clear. In some embodiments, the UL schedule is part of a schedule that does not use a predefined split pattern for UL and DL transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor, the code comprising:
  code that determines an uplink schedule for data to be transmitted from a user equipment; and
  code that determines a downlink schedule for data to be provided to the user equipment;
a transmitter that provides an uplink grant message to the user equipment to initiate an uplink transmission based on the uplink schedule, wherein the uplink transmission comprises an uplink burst comprising one or more consecutive subframes with a last subframe at least partially occupied, the uplink grant message comprises a single bit subframe type indication within the uplink grant message to indicate whether the last subframe is to be full or not full, a first value of the single bit subframe type indication indicates that the last subframe is to be full, a second value of the single bit subframe type indication indicates that a first consecutive slot of the last subframe comprises transmission data from the uplink transmission and a second consecutive slot of the last subframe does not comprise data from the uplink transmission, and the first consecutive slot of the last subframe directly following a subframe prior to the last subframe; and
a receiver that receives the uplink transmission, wherein, in response to the single bit subframe type indication being the second value:
  the processor performs a clear channel assessment in the second consecutive slot of the last subframe of the uplink burst and the transmitter transmits downlink data directly following the clear channel assessment;
wherein the uplink schedule and the downlink schedule combination is determined based on an amount of uplink traffic and downlink traffic, and the uplink schedule and the downlink schedule combination is time division duplex such that the uplink schedule occupies a first set of subframes of a frame period and the downlink schedule occupies a second set of subframes of the frame period.

2. The apparatus of claim 1, wherein the code comprises code that reserves a gap between downlink transmission and the uplink transmission to enable the user equipment to perform a clear channel assessment ("CCA").

3. The apparatus of claim 1, wherein the uplink grant message comprises an indication that indicates timing for the uplink transmission.

4. The apparatus of claim 2, wherein the indication within the uplink grant message comprises an offset between a subframe in which the uplink grant message is received and a subframe in which the uplink transmission begins.

5. The apparatus of claim 2, wherein the indication within the uplink grant message comprises an index to indicate a subframe in which to begin the uplink transmission.

6. A method comprising:
determining, by use of a processor, an uplink schedule for data to be transmitted from a user equipment;
determining a downlink schedule for data to be provided to the user equipment;
providing an uplink grant message to the user equipment to initiate an uplink transmission based on the uplink schedule, wherein the uplink transmission comprises an uplink burst comprising one or more consecutive subframes with a last subframe at least partially occupied, the uplink grant message comprises a single bit subframe type indication within the uplink grant message to indicate whether the last subframe is to be full or not full, a first value of the single bit subframe type indication indicates that the last subframe is to be full, a second value of the single bit subframe type indication indicates that a first consecutive slot of the last subframe comprises transmission data from the uplink transmission and a second consecutive slot of the last subframe does not comprise data from the uplink transmission, and the first consecutive slot of the last subframe directly following a subframe prior to the last subframe; and
receiving the uplink transmission, wherein, in response to the single bit subframe type indication being the second value:
  performing a clear channel assessment in the second consecutive slot of the last subframe of the uplink burst; and
  transmitting downlink data directly following the clear channel assessment;
wherein the uplink schedule and the downlink schedule combination is determined based on an amount of uplink traffic and downlink traffic, and the uplink schedule and the downlink schedule combination is time division duplex such that the uplink schedule occupies a first set of subframes of a frame period and the downlink schedule occupies a second set of subframes of the frame period.

7. The method of claim 6, comprising reserving a gap between downlink transmission and the uplink transmission to enable the user equipment to perform a clear channel assessment ("CCA").

8. The method of claim 6, comprising performing a listen before talk ("LBT") operation to determine whether an operating channel is clear.

9. The method of claim 8, comprising providing a downlink transmission based on the downlink schedule if the operating channel is clear.

10. The method of claim 8, wherein performing the LBT operation comprises performing the LBT operation in a second slot of a last subframe of the uplink transmission.

11. The method of claim 6, wherein providing the uplink grant message to the user equipment to initiate the uplink transmission comprises providing an indication within the uplink grant message to indicate timing for the uplink transmission.

12. The method of claim 11, wherein providing the indication within the uplink grant message to indicate the timing for the uplink transmission comprises providing an offset between a subframe in which the uplink grant message is received and a subframe in which the uplink transmission begins.

13. The method of claim 11, wherein providing the indication within the uplink grant message to indicate the timing for the uplink transmission comprises providing an index to indicate a subframe in which to begin the uplink transmission.

14. An apparatus comprising:
a receiver that receives an uplink grant message;
a processor;
a memory that stores code executable by the processor, the code comprising code that determines an uplink schedule for data to be transmitted based on a portion of the uplink grant message, wherein the data to be transmitted comprises an uplink burst comprising one or more consecutive subframes with a last subframe at least partially occupied, the uplink grant message comprises a single bit subframe type indication within the uplink grant message to indicate whether the last subframe is to be full or not full, a first value of the single bit subframe type indication indicates that the last subframe is to be full, a second value of the single bit subframe type indication indicates that a first consecutive slot of the last subframe comprises transmission data from the uplink transmission and a second consecutive slot of the last subframe does not comprise data from the uplink transmission, and the first consecutive slot of the last subframe directly following a subframe prior to the last subframe; and
a transmitter that transmits data to a base station based on the uplink schedule,
wherein, in response to the single bit subframe type indication being the second value:
the base station performs a clear channel assessment in the second consecutive slot of the last subframe of the uplink burst; and
the base station transmits downlink data directly following the clear channel assessment;
wherein the uplink schedule is part of a schedule determined based on an amount of uplink traffic and downlink traffic, and the schedule is time division duplex such that the uplink schedule occupies a first set of subframes of a frame period and a downlink schedule occupies a second set of subframes of the frame period.

15. A method comprising:
receiving, by use of a processor of a user equipment, an uplink grant message;
determining an uplink schedule for data to be transmitted based on a portion of the uplink grant message, wherein the data to be transmitted comprises an uplink burst comprising one or more consecutive subframes with a last subframe at least partially occupied, the uplink grant message comprises a single bit subframe type indication within the uplink grant message to indicate whether the last subframe is to be full or not full, a first value of the single bit subframe type indication indicates that the last subframe is to be full, a second value of the single bit subframe type indication indicates that a first consecutive slot of the last subframe comprises transmission data from the uplink transmission and a second consecutive slot of the last subframe does not comprise data from the uplink transmission, and the first consecutive slot of the last subframe directly following a subframe prior to the last subframe; and
transmitting the data to a base station based on the uplink schedule, wherein, in response to the single bit subframe type indication being the second value:
the base station performs a clear channel assessment in the second consecutive slot of the last subframe of the uplink burst; and
the base station transmits downlink data directly following the clear channel assessment;
wherein the uplink schedule is part of a schedule determined based on an amount of uplink traffic and downlink traffic, and the schedule is time division duplex such that the uplink schedule occupies a first set of subframes of a frame period and a downlink schedule occupies a second set of subframes of the frame period.

16. The method of claim 15, wherein determining the uplink schedule for data to be transmitted based on the portion of the uplink grant message comprises determining the uplink schedule based on an indication within the uplink grant message of an offset between a subframe in which the uplink grant message is received and a starting subframe for uplink transmission.

17. The method of claim 15, wherein determining the uplink schedule for data to be transmitted based on the portion of the uplink grant message comprises determining the uplink schedule based on an indication within the uplink grant message of an index of a starting subframe for uplink transmission.

* * * * *